Sept. 21, 1943.    D. R. YARNALL    2,330,102
LIQUID LEVEL GAUGE
Original Filed May 16, 1940
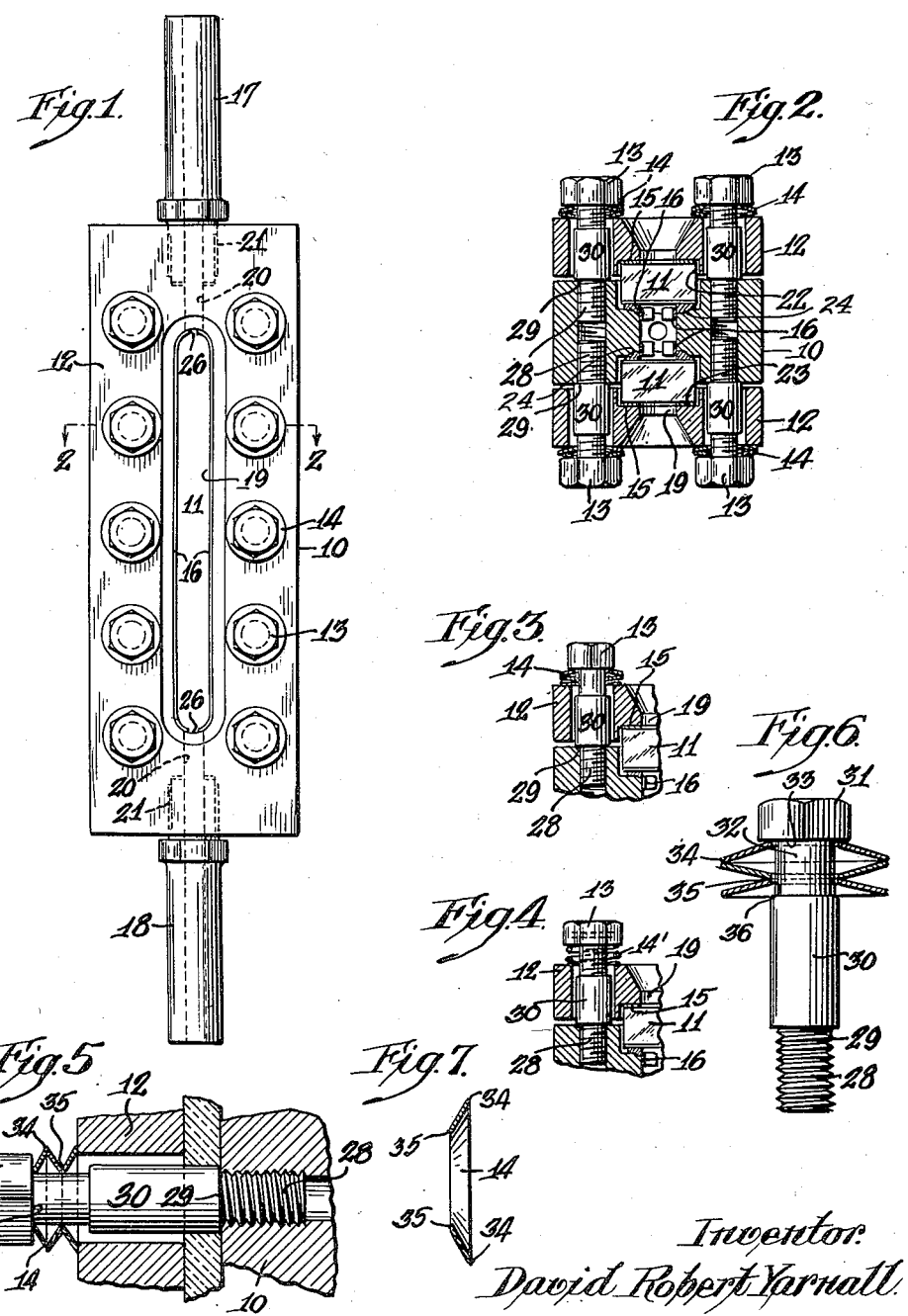

Patented Sept. 21, 1943

2,330,102

UNITED STATES PATENT OFFICE 2,330,102

LIQUID LEVEL GAUGE

David Robert Yarnall, Philadelphia, Pa., assignor to Yarnall-Waring Company, Philadelphia, Pa., a corporation of Pennsylvania Original application May 16, 1940, Serial No. 335,597. Divided and this application May 15, 1941, Serial No. 393,530

8 Claims. (Cl. 73—330)

My present invention, intended for any use to which it may be adapted, relates to flat glass water-level gauges.

A purpose of the invention is to cushion the pressure upon a flat insert and at the same time to take care of expansion and contraction and particularly to compensate for variation in expansion and contraction of parts with temperature change and for deflections due to variations in stress with change in internal pressure.

A further purpose is to secure uniform compression of the flat glass insert upon its seat by resilient individual springs held down by bolts, limiting and predetermining the pressure of each bolt upon the cover plates.

A further purpose is to make it impossible for an operator when replacing a flat glass plate to crush the glass by too much pressure at one or more of the studs bolting down the cover.

A further purpose is to prevent a pressure seal gasket under a flat gauge glass from blowing back into the visible gauge space when an operator blows down the gauge by a retaining strip welded to the gauge body.

Further purposes will appear in the specification and in the claims.

I have elected to show my invention in a few only of its forms, selecting forms, however, that are practical and efficient in operation and which well illustrate the principles involved.

The present application is a division of my application for Resilient protection for flat gauge glasses, Ser. No. 335,597 filed May 16, 1940.

Figure 1 is an elevation intended, except for the features indicated at 16 and 26, for a conventional showing of any structure adapted to embody my present invention.

Figure 2 is a section of Figure 1 taken upon the line 2—2 thereof.

Figures 3 and 4 are fragmentary sections corresponding generally to Figure 2 but showing modifications.

Figure 5 is an assembly view of the holding means for a cover.

Figure 6 is an elevation of a stud and its associated parts, intended itself to embody a new article of commerce.

Figure 7 is a perspective of a conical spring.

Like numerals refer to like parts in all figures.

Describing in illustration and not in limitation and referring to the drawing:

The gauge structure illustrated comprises a body 10 to which flat glass plates 11 are held by covers 12.

In the form of Figures 1, 2, 3, 5 and 6, studs 13 carry spring cones 14 by which the parts are held in place, resiliently pressing gaskets 15.

In all of the forms retaining strips 16 restrain inward movement of the packing. Upper and lower conventional outlet nipples 17 and 18 are shown for connection to the steam and water spaces, respectively, of a boiler.

The body 10 and covers 12 are longitudinally through-slotted at 19 for intermediate portions of their lengths forming long straight slots with curved ends. The body is bored and counterbored at its ends at 20 and 21 to receive the nipples 17 and 18. Covers 12 and body 10 are oppositely recessed at 22 and 23 about the through slot 19 to receive the flat glasses 11, and are formed at the bottoms of the recesses 22 and 23 to seat the endless gaskets 15. The bottoms of recesses 22, 23 in body 10 are tapered so as to be shallower at the outsides than at the insides to provide outward flares at 24 so that the progressive outward constriction of the gasket space causes the high pressure within the gauge compartment to tighten the gasket in the space as it presses the gasket outwardly. Each gasket adjacent a strip 16 seals against its tapered seat and against the inner face of the glass.

One feature of the invention is directed to the retaining strips 16. A continuous or endless retaining strip integral with the body and immediately inwardly adjacent a gasket of the type indicated has been disclosed in an application of Walter J. Kinderman, Patent No. 2,201,542, issued May 21, 1940 for Gauge glass with gasket and gasket seat.

Applicant finds this integral construction awkward and difficult to manufacture. The Kinderman groove is easily cut along the straight lengths by a milling cutter but this cutter if of full groove size cannot be turned to follow the end half circle paths without destroying the inner groove walls; and if of less than full groove size it is still difficult to finish the groove properly at these curved ends.

Applicant uses strips which are separate and which are welded against the inner edge of the indicator body or other body seen in Figure 1. The strips are not needed as much at the ends but may follow the curves at the ends. A space 26 is indicated between the opposing ends of the strips 16. This space may be large or small. It is intended to accommodate temperature changes during welding.

A principal feature of the invention is directed to the resilient, limited, and predetermined compression of the covers 12 upon the glasses 11, securing right compression upon the glasses 11 despite small dimentional variations of any of the gauge members and despite any other small outward variation of either glass.

A variety of types of stud assemblies is shown each described in detail because it forms or may form a part of the assembly by which the cushioning of the plates is effected, and a limit is placed upon the extent to which compression may be carried, avoiding accidental careless or reckless seating of the individual studs of whichever form shown and permitting the assemblage to be made safely and yet at much higher speed than where individual judgment is required. Each stud 13 comprises a threaded end 28, a shoulder 29 adjacent the thread, an enlarged section 30 which provides the shoulder, a head 31 by which the stud is screwed in place and a reduced cross-section or neck 32 between the enlarged section 30 and the inward face 33 of the head.

It will be noted that what has been treated as a stud above is in effect a bolt when the work is finished. The bolt has a threaded end to fit into the body, and the "head" is fixed with respect to the said threaded end. This is true whatever the previous condition or history of the fastening may be, and notwithstanding that in forms where I contemplate starting with a double threaded stud and placing a nut upon the exposed part of the stud, the rigidity of the head is given not by integrality but by fastening a nut to its thread.

About a reduced "neck" of the bolt is located spring material. In Figures 2, 3 and 6 appear a plurality of spring cones 14, placed base 34 to base 34 or crown 35 to crown 35 so that they are cumulative in their spring effects. Two are used in Figure 2, and three in Figures 3 and 6. In another form (Figure 4) a spring 14' is used.

The shoulder need not be extensive. It need be enough definitely to set a limit to the seating of the studs, as distinguished from allowing the extent of insertion of the studs to depend upon the uncertainties of the cutting of the thread. Excellent results have been secured with but a few hundredths of an inch of shoulder.

The inner diameter 36 of the inner cone considered as a retaining washer, or of the spring, is such that it fits loosely upon the neck portion of the stud but is too small to slip off from the stud.

Where the head is originally separate and has been added (Figures 2 and 4) this inner diameter 36 may be quite noticeably smaller than either the enlargement or the head and the cones may be applied before the head is applied. This offers opportunity for individual adjustment of the pressure because the head can be located at different distances from the shoulder and hence can provide for different pressures upon the spring washers or spring.

The studs 13, together compressing the cover upon the glass 11, thread home into the body 10 until shoulders 29 engage the outer face of the body about the thread. Meantime spring cones 14, or springs 14' are compressed between inwardly directed (head) face 33 carried by the stud and the surface of the cover about the stud.

It will be seen that each stud assembly comprises a stud 13 providing an inwardly directed shoulder that determines the operating position of the stud when threaded into the body, and a head setting a predetermined distance allowed for cover thickness and compression spring cones of spring. Moreover the group of spring cones 14 or spring is kept in assembly with the stud.

The present invention compensates for the weaving of plate gauge glasses caused by the body of the gauge heating up first and the heating of the cover lagging sufficiently to cause a slip between the body and the cover.

It is intended also to provide tolerances ample for avoidance of injury by reason of accidental variation of dimensions from the limits set.

The position of the stud head with respect to the shoulder engaging the body forms the limit to avoid excessive compression. The extent of compression of the spring cones or springs used must be such as, with the variations met with in practice in expansion etc., avoids excessive compression with maximum stress on the one hand and insures that with minimal stress there shall not be low enough pressure to permit leakage.

After standardization of equipment, determining extents of compression of packing at the pressure contemplated, extents of compression of springs for these pressures, number of cones or length of springs desirably used, and, as derived from them, over-all spacing between the shoulders of the stud and the under sides of the heads, the studs can be duplicated as standard for the equipment thus tested. However, the tests for a new piece of equipment are simple in determination of the spacing to be given between the shoulders and the under sides of the head either for all the studs of this new equipment or for individual studs, if for any reason it be desired to give them different characteristics.

In practically determining the stud dimensions the best means known by me is based upon use of a stud of which an example is shown in Figures 2 and 4 having a thread at each end, an intermediate enlargement forming a shoulder and a neck above the intermediate enlargement. This stud is screwed "home" so as to shoulder against the body, and the packing and cover are put in place over the stud. The cones or spring desired are or is mounted over the outer thread and a nut is screwed down upon its outer thread until, as determined by the wrench leverage and the pressure applied, the desired spring pressure has been reached. The position of the nut upon the screw is then marked for duplication after removal of the nut and stud, or the nut and stud are drilled and pinned together as in Figure 4 to set the nut. The stud is removed and the nut is welded to the stud at the desired position or the position to which the nut is set by the pin is maintained.

In either event above this individual stud will then serve the purpose at the position at which it has been set or if the studs are to be uniform may be used as a model for the production of other studs. The number of spring cones used or the length of spring applied depends upon the intended tolerance. For example, if the range of compressive distance by which compression of a single cone may be acceptable be a sixty-fourth of an inch a single cone would give but a sixty-fourth inch of permissible variation, whereas the two cones of Figure 2 or the three cones of Figures 3 and 6 would give a thirty-second of an inch or three sixty-fourths inch permissible variation, respectively. For the same reasons additional coil length of any given spring increases the tolerance in the use of that spring.

In the unusual case where the studs are to be differently set for the same cover the procedure above can be followed and the individual studs as determined can be marked for their selected positions.

Where, as in Figures 5 and 6, the "head" is integral with the stud, the head is left "long" initially. The cones or spring are or is passed over the enlargement 30 and are tightened against the cover. If it be seen that the cones or spring are or is unduly compressed in screwing the stud home, the under face of the head is cut away until the distance is right and this stud is used for a sample. In the solid head structure the cones are made a tight enough fit over the stud shoulder so that, though they can be forced over to occupy the neck position they cannot be removed without application of considerable force and will not fall off. The spring, correspondingly tight over the shoulder, can be partially unwound for passage over the shoulder and merely resumes its coil tightness within the stud neck.

This condition in which the spring washer can be forced over the shoulder or body to fit into the recess is viewed herein as a forced fit and means that the inside diameter of the spring is approximately equal to the outside of the body of the bolt, and the spring can be forced over it. This is what is ordinarily known in machine shop practice as a "forced" fit or "drive fit."

The data required for design of studs for new conditions may also be determined from a laboratory study of the characteristics of the elements involved. For example, the amount of compression of standard cones and springs for each of different pressures in pounds may be determined by experiment, as also the extent of compression of different packings at various pressures. Such information is also available from manufacturers of the materials. From this data and the thickness of the several comparatively incompressible parts the distance between the stud shoulder and the under face of the nut or head upon the stud is easily worked out.

The preferred form of spring material is the spring cone.

It will be evident that when the reduced portion next to the head is called a neck this does not indicate that there need be much difference in diameter between it and the enlargement bounding it toward the shoulder end of the stud or between it and the shoulder. It means merely that the enlargement or the shoulder, if it serve the purpose, shall be sufficient to prevent accidental removal of the cones or spring from the neck and that the neck shall be small enough for the cones or spring to move upon it without undue friction. As there is no advantage in making the neck a close fit within the cones or spring there is a considerable range of neck diameter which will be satisfactory.

It will be clear that the head performs two main functions affording convenient wrench engagement for setting the stud so that the shoulder of the stud abuts against the outer surface of the body, and pressing against the outer end of the spring or a cone to accomplish the compression of the spring or cones. Where the smaller cone end of a spring cone extends outwardly the engagement with the cone to compress it will be satisfied by a very small engaging surface; and the function of providing wrench engagement can be satisfied by a variety of terminals well recognized in the stud art.

It will be evident that both of the means illustrated, though in different ways, provide resilient pressure, protecting by intervention of resilient means for taking up and equalizing the pressure in the train of pressure between the threaded retaining devices (whether initially in the form of studs without rigidly attached heads and subsequently made into bolts or always with permanently attached heads conforming to the more usual type of bolts) and the glass and unifying the pressure as well as controlling the maximum pressure to be applied by limiting the extent of movement of the devices. In the illustrations equalization is by individual resilient studs (bolts) acting through a cover, which cover is not limited in movement except by its pressure engagements through a gasket with the glass.

It will also be clear that the gasket is relieved from excessive pressure by either type of fastening devices, whether initially stud and nut or bolt. Both are capable of bringing pressure upon the cover, with intervening spring elements, and using shoulder limitation of the distance to which they may be tightened.

The guard or protector 16 shown in Figures 1 and 2 is inserted within the upper part of the through slot in the body and is held in position by any suitable means while its strips are welded to place, supplying a protection against inward slip of the packing during blowing down of the gauge. This construction is more cheaply constructed than is the integral form. Because of being separate metal it may be thinner than a corresponding integral construction would be.

Where I refer to parts in series, such as the series of spring washers seen in Figures 5 and 6, I mean that the parts act in a train, one through another. In the present case no one of these spring washers in Figures 5 and 6 can be axially compressed without bringing compressive pressure upon the adjacent spring washer or washers in the series arrangement.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In a flat glass sight indicator for fluid levels, a body through-slotted and recessed about the slot, a glass, packing between the body and the glass, a slotted cover adapted to press the glass into fluid tight engagement with the packing, a plurality of bolts tightened to hold the cover in position, spring means surrounding the bolts between the bolt heads and the glass for cushioning the pressure upon the glass and means for stopping tightening of the bolts while the spring means is still resilient and before the spring of the means has been fully taken up, whereby the pressure upon the glass is limited and is maintained as a resilient pressure as distinguished from from an unyielding pressure.

2. In a flat glass sight indicator for fluid levels, a body through-slotted and recessed about the slot, a glass within the recess, packing between the body and the glass, a slotted cover, a plurality of bolts holding the cover in position, shoulders limiting the extent to which the bolts can be screwed into the body and compressible spring means surrounding the bolts for cushioning the pressure upon the glass, located between the bolt heads and the glass, the extent of possible compression of the spring means being thus positively predetermined by the positions of the shoulders.

3. In a flat glass sight indicator for water levels, a body longitudinally through-slotted and recessed about the slot, packing within the recess, a flat glass entering the recess and engaging the packing, a cover through-slotted in agreement with the slot of the body, through which cover pressure is transmitted to the glass, a plurality of threaded retaining devices passing through the cover and entering the body, holding it in position, the devices having heads and integral shoulders, and spring compression means located in series, one each between each of the heads of the devices and the cover and whose extent of compression and consequent extent of pressure upon the cover is limited by engagement of the shoulders with the body.

4. In a flat glass sight indicator for water level, a body longitudinally through-slotted and recessed about the slot, packing within the recess, a flat glass entering the recess and engaging the packing, a slotted cover adapted to bring pressure upon the glass, a plurality of bolts passing through the cover and the threads entering the body to hold the cover in position, the extent of movement of the cover being determined by its engagement with the glass and the extent of pressure upon the cover being determined by the extent to which the bolts can enter the body and compression spring means surrounding the bolts and pressing against the cover, the extent of spring pressure being positively limited to leave the spring means but partly compressed.

5. In a water level indicator, a body through-slotted for a portion of its length and having a channel, a closure glass entering the channel, packing for the closure glass, a cover holding the closure glass in position and having holes through the cover, studs passing through the holes in the cover, threaded into the body and having enlargements limiting the extent of entry into the body, spring cones about the studs and heads permanently secured to the studs and by their positions longitudinally of the studs determining the extent of compression of the spring cones when the studs have been screwed in until stopped by the enlargements.

6. In a flat glass sight indicator for water levels, a body longitudinally through-slotted and recessed about the slot, packing within the recess, a flat glass entering the recess and engaging the packing, a slotted cover through which pressure is transmitted to the packing, a plurality of studs threaded at both ends, one end of each stud passing through the cover and entering the body, a shoulder adjacent the threaded end which passes through the cover, limiting the extents to which the individual studs can be screwed into the body, springs, one surrounding each stud outside the cover, nuts, one each upon the second thread of each stud and pins, one passing through each nut and stud to make each stud effective as a bolt and each nut effective as a bolt head.

7. In a flat glass sight indicator for fluid levels, a body, through-slotted and recessed about the slot, a glass, packing between the body and the glass, a slotted cover adapted to press the glass into fluid tight engagement with the packing, the cover having holes for fastenings, a plurality of studs extending through the holes in the cover and threaded into the body as far as they can be screwed, the studs being threaded at their ends farther from the body, compression spring means surrounding the threads at the outer ends of the studs beyond the cover, nuts on the stud threads beyond the spring means and holding the spring means but partially compressed and pins passing through the nuts and threaded portions of the studs, whereby the nuts are fixed rigidly upon the stud ends, making the studs effective as bolts, the pressure is maintained as resilient pressure and a maximum pressure upon the cover is set.

8. In a water level indicator, a body through-slotted for a portion of its length and having a channel about the slot, a glass closure plate in the channel, packing for the closure glass, a flange restraining the packing against movement inwardly and welded to the edge of the through slot, a slotted cover for the body holding the glass in place and means for pressing the cover toward the body.

DAVID ROBERT YARNALL.